United States Patent
Park et al.

(10) Patent No.: US 8,535,804 B2
(45) Date of Patent: Sep. 17, 2013

(54) INORGANIC ARTIFICIAL MARBLE AND COMPOSITION FOR INORGANIC ARTIFICIAL MARBLE

(75) Inventors: Joon Hyun Park, Uiwang-si (KR); Chang Ho Son, Uiwang-si (KR); Dong Hee Kim, Uiwang-si (KR); Eung Seo Park, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 632 days.

(21) Appl. No.: 12/642,148

(22) Filed: Dec. 18, 2009

(65) Prior Publication Data

US 2010/0154676 A1   Jun. 24, 2010

(30) Foreign Application Priority Data

Dec. 19, 2008 (KR) .................... 10-2008-0130390

(51) Int. Cl.
*C03C 17/28* (2006.01)
*C03C 17/32* (2006.01)

(52) U.S. Cl.
USPC .................... 428/406; 428/407; 106/286.1

(58) Field of Classification Search
USPC .................. 428/15, 402–408; 106/481, 631, 106/286.1, 286.2, 286.5, 287.1; 523/171
See application file for complete search history.

(56) References Cited

U.S. PATENT DOCUMENTS

| | | | | |
|---|---|---|---|---|
| 4,888,311 A | * | 12/1989 | Davidovits et al. | ........... 501/95.2 |
| 6,511,750 B1 | * | 1/2003 | Yanagase et al. | ............. 428/406 |
| 6,632,527 B1 | * | 10/2003 | McDaniel et al. | ............. 428/402 |
| 6,894,163 B2 | * | 5/2005 | Tsunoda et al. | ............. 540/536 |
| 2001/0051674 A1 | * | 12/2001 | Renzi et al. | ................... 523/171 |
| 2005/0261122 A1 | * | 11/2005 | Quesada Perez et al. | ....... 502/80 |

* cited by examiner

*Primary Examiner* — Pegah Parvini
(74) *Attorney, Agent, or Firm* — Summa, Addition & Ashe, P.A.

(57) ABSTRACT

The present invention provides an inorganic artificial marble having excellent impact strength and weather resistance. The inorganic artificial marble can be a substitute for natural stone and used as an exterior finishing material.

24 Claims, 1 Drawing Sheet

INORGANIC ARTIFICIAL MARBLE AND COMPOSITION FOR INORGANIC ARTIFICIAL MARBLE

CROSS REFERENCE TO RELATED APPLICATIONS

This application claims priority from Korean Patent Application No. 2008-0130390, filed Dec. 19, 2008 in the Korean Intellectual Property Office, and Korean Patent Application No. 2009-122374, filed Dec. 10, 2009 in the Korean Intellectual Property Office, the disclosure of which is incorporated herein by reference in its entirety.

FIELD OF THE INVENTION

The present invention relates to an inorganic artificial marble and a composition for an inorganic artificial marble.

BACKGROUND OF THE INVENTION

Artificial marble used as architectural materials may be classified into two groups according to the base resin material. One group represents acrylic artificial marble, and the other group represents unsaturated polyester artificial marble. Acrylic artificial marble has found wide utilization as a material for kitchen countertops, wash basins, dressing tables, bathtubs, various table surfaces, wall materials, interior articles, and the like, because it has an excellent appearance, high-gloss texture, and good weather resistance, as compared to unsaturated polyester artificial marble. Generally, acrylic artificial marble is prepared by mixing inorganic filler and initiator and adding marble chips of various colors to provide a natural stone texture.

Various patterns can be developed so that artificial marble has an appearance that is similar to natural stone. However, it can be difficult to use artificial marble as exterior finishing materials because of gloss and low weather resistance imparted thereto by the base resin, which includes an organic material. For example, conventional engineered stone has poor weather resistance because it includes an organic binder, and general cement stone may have poor chemical resistance, such as susceptibility to acidic rain, because it has a high surface pH.

SUMMARY OF THE INVENTION

The present invention provides an inorganic artificial marble which can have excellent mechanical strength and weather resistance. The present invention further provides an inorganic artificial marble which can have excellent coloring resistance and durability. The present invention further provides an inorganic artificial marble which can be environmentally friendly, can be a substitute for natural stone and can be used as an exterior finishing material.

The present invention further provides a method for preparing an inorganic artificial marble which can embody a pattern resembling natural stone.

The present invention further provides a composition for preparing the inorganic artificial marble.

In exemplary embodiments of the present invention, the inorganic artificial marble comprises an inorganic matrix. The inorganic matrix may comprise an inorganic powder and an activator. In one embodiment of the present invention, the inorganic matrix may comprise about 5 to about 95% by weight of the inorganic powder and about 5 to about 95% by weight of the activator.

The inorganic powder may include Al, Si, O, alkali metal and/or alkaline earth metal as an essential component, for example kaolin, brucite or a combination thereof. The inorganic powder can further comprise an alkali metal hydroxide powder, alkaline earth metal hydroxide powder, or a combination thereof. The size of the inorganic powder may be about 1 to about 100 μm.

The activator may include an alkali metal silicate compound, alkaline earth metal silicate compound or a combination thereof.

In another embodiment of the present invention, when the amount of inorganic material in the inorganic matrix is analyzed by IPC-OES, the inorganic material comprises about 20 to about 40% by weight of Al and Si and about 60 to about 80% by weight of alkali metal and/or alkaline earth metal.

The inorganic matrix may further comprise an inorganic polymer such as poly(sialate), poly(sialate-siloxo), poly(sialate-disiloxo), or a combination thereof.

The inorganic artificial marble may further include a chip component distributed in the inorganic matrix. The chip component may have size of about 0.5 to about 30 mm and may comprise organic chips, inorganic chips or a combination thereof. The organic chips may include unsaturated polyester chips, acrylic chips, halogenated epoxy acrylate chips, halogenated urethane acrylate chips, halogenated ethoxy acrylate diacrylate chips or a combination thereof. The inorganic chips may include quartz, quartz-silica chips, silicate stone powder, quartz glass, synthetic quartz, silica (silicon dioxide), silica glass, mirror or a combination thereof.

In exemplary embodiments of the present invention, the inorganic artificial marble may include the inorganic matrix in an amount of about 1 to about 50% by weight and the chip component in an amount of about 50 to about 99% by weight.

The present invention further provides a composition for an inorganic artificial marble comprising about 1 to about 50% by weight of an inorganic matrix including about 5 to about 95% by weight of an inorganic powder (a) including about 1 to about 67.7% by weight of Al, about 3 to about 69.7% by weight of Si, about 20 to about 86.7% by weight of O, and about 5 to about 95% by weight of activator (b), and about 50 to about 90% by weight of a chip component.

The activator may comprise an alkali metal silicate compound, alkaline earth metal silicate compound, or a combination thereof. The alkali metal silicate compound, alkaline earth metal silicate compound or a combination thereof may be in the form of an aqueous solution phase having a solid content of about 1 to about 80% by weight. The activator may include an acidic activator.

The composition for an inorganic artificial marble of the present invention may be further include one or more additives such as a colorant, coupling agent, ultraviolet absorber, antistatic agent, inorganic tiller and the like and combinations thereof.

The composition for an inorganic artificial marble can be hardened to form the inorganic artificial marble. The inorganic artificial marble can have a pH of about 6 to about 8 measured by filtering an aqueous solution which comprises about 50% by weight of a sanding residue powder from the artificial marble after one hour and then measuring the pH of the filtered solution.

The present invention now will be described more fully hereinafter in the following detailed description of the invention.

DETAILED DESCRIPTION OF THE INVENTION

Figure 1:
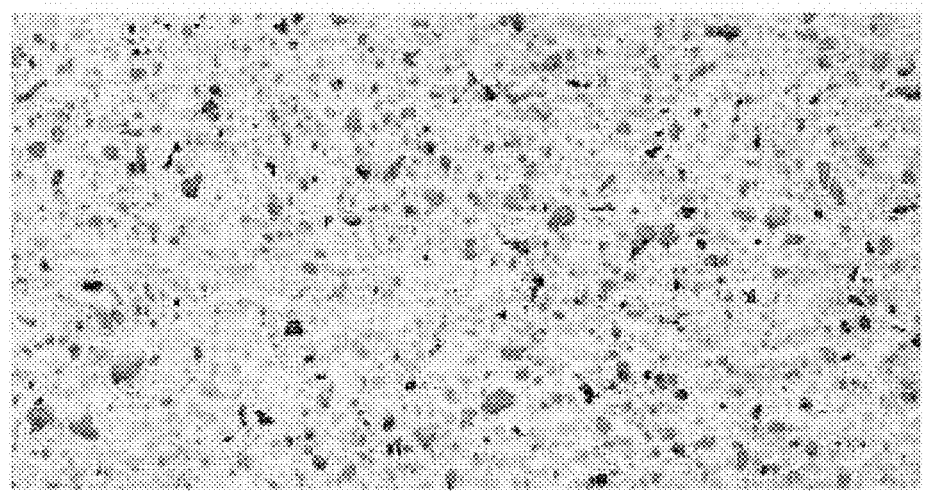
FIG. 1 is a picture representing a product of the inorganic artificial marble prepared according to Example 1 of the present invention.

The present invention provides an inorganic artificial marble which may have a surface pH of about 6 to about 8. The inorganic artificial marble of the invention includes an inorganic matrix, which comprises an inorganic powder and an activator. In one embodiment of the present invention, the inorganic matrix may comprise about 5 to about 95% by weight of the inorganic powder and about 5 to about 95% by weight of the activator.

The inorganic powder may comprise one or more compounds including Al, Si, and/or O as an essential component, such as but not limited to aluminum oxide, silicon dioxide, magnesium oxide, calcium oxide, iron oxide, manganese oxide and the like and combinations thereof.

In another embodiment of the present invention, the inorganic powder can include one or more kinds of oxides comprising about 1 to about 67.7% by weight of Al, about 3 to about 69.7% by weight of Si, and about 20 to about 86.7 by weight of O as an essential component. For example, the inorganic powder may comprise kaolin, brucite or a combination thereof. The inorganic powder may be prepared by baking kaolin, brucite, or a combination thereof at a temperature of from 300° C. to 350° C.

Exemplary inorganic powders may further comprise without limitation alkali metal oxide powder, such as potassium hydroxide or sodium hydroxide, alkaline earth metal powder, and the like, and combinations thereof.

The inorganic powder may have a size of about 1 to about 100 μm, for example about 5 to about 50 μm.

Exemplary activators included in the inorganic matrix may comprise without limitation alkali metal silicate compounds, alkaline earth metal silicate compounds, and combinations thereof.

In an embodiment of the present invention, when the amount of the inorganic material in the inorganic matrix is analyzed by IPC-OES, the inorganic material comprises about 20 to about 40% by weight of Al and Si, and about 60 to about 80% by weight of alkali metal and/or alkaline earth metal.

The inorganic artificial marble may further comprise an inorganic polymer such as poly(sialate), poly(sialate-siloxo), poly(sialate-disiloxo), or a combination thereof. For example, the inorganic artificial marble may include an inorganic polymer having a structure represented by the following Chemical Formula 1 or Chemical Formula 2 or a combination thereof.

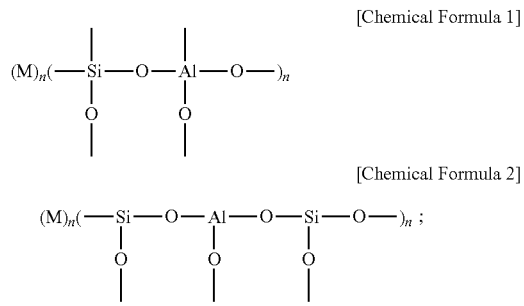

[Chemical Formula 1]

[Chemical Formula 2]

wherein in both of Chemical Formula 1 and Chemical Formula 2, each M is independently a Group I, II or VIII element of the Periodic Table or a combination thereof, and each n represents the number of repeat units and independently can range from 1 to 1000.

In another embodiment of the present invention, the inorganic artificial marble includes the inorganic matrix in an amount of about 1 to about 50% by weight and the chip component in an amount of about 50 to about 99% by weight.

The chip component may have size of about 0.5 to about 30 mm. Moreover, the chip component may have an irregular shape for embodying a natural pattern. Examples of the irregular shape may include without limitation an irregular particle shape and needle-like structure.

The chip may include an inorganic chip, an organic chip or a combination thereof. The organic chip may include without limitation unsaturated polyester chip, acrylic chip, halogenated epoxy acrylate chip, halogenated urethane acrylate chip, halogenated ethoxy acrylate diacrylate chip or a combination thereof. Exemplary acrylic chips may include without limitation an acrylic artificial marble powder, an acrylic light guide plate powder and the like, and combinations thereof. In an exemplary embodiment of the present invention, the acrylic artificial marble powder may be prepared by hardening about 100 parts by weight of an acrylic resin, about 100 to about 300 parts by weight of an inorganic filler, about 0.1 to about 10 parts by weight of a polymerization initiator and about 0 to about 200 parts by weight of a marble chip and pulverizing the hardened material. The chip may be transparent, semi-transparent or opaque.

When the chip includes a marble chip, the chips which have a relatively small size may be prepared, thereby double layered chip or triple layered chip can be formed. In another embodiment of the present invention, layers of two or more kinds of colors can be prepared.

Exemplary inorganic chips may comprise without limitation broken stone chip, quartz, quartz-silica chip, silica stone powder, quartz glass, synthetic quartz, silica silicon dioxide, silica glass, mirror and the like, and combinations thereof.

The present invention further provides a composition for an inorganic artificial marble comprising about 1 to about 50% by weight of an inorganic matrix including about 5 to about 95% by weight of an inorganic powder (a) including about 1 to about 67.7% by weight of Al, about 3 to about 69.7% by weight of Si, about 20 to about 86.7% by weight of O and about 5 to about 95% by weight of activator (b), and about 50 to about 90% by weight of a chip component.

An inorganic artificial marble can be prepared from the composition for inorganic artificial marble described above.

The inorganic matrix comprising the inorganic powder (a) and the activator (b) is the same as the inorganic matrix of the inorganic artificial marble described above.

Exemplary activators may comprise without limitation alkali metal silicate compounds, alkaline earth metal silicate compounds, and the like, and combinations thereof. The alkali metal silicate compound, alkaline earth metal silicate compound or a combination thereof may be in the form of an aqueous solution phase having a solid content of about 1 to about 80% by weight.

The activator may alternatively be a colloidal solution having an alkali metal silicate and/or alkali earth metal silicate solid content of about 1 to about 80% by weight, for example about 30 to about 70% by weight, and as another example, about 50 to about 60% by weight.

The activator may further comprise a pH control agent. For example, the pH control agent can be an acidic pH control agent. Examples of acidic pH control agent may include without limitation sulfuric acid, nitric acid, hydrochloric acid, phosphoric acid, acetic acid, formic acid and the like, and combinations thereof. The activator which can include the acidic pH control agent may have a pH about 0.1 to about 6, for example, a pH about 1 to about 2.

The composition for inorganic artificial marble may further include conventional additives such as a colorant, coupling agent, ultraviolet absorber, antistatic agent, inorganic tiller and the like and combinations thereof. In an exemplary embodiment of the present invention, the colorant can be used in an amount of about 0.1 to about 5 parts by weight, for example about 0.3 to about 2 parts by weight, based on about 100 parts by weight of the composition. The inorganic filler may be used in an amount of about 0.1 about 35 parts by weight, for example about 1 to about 30 parts by weight, based on about 100 parts by weight of the composition.

The inorganic artificial marble of the present invention may be prepared by hardening the composition for an inorganic artificial marble described herein and can have a surface pH of about 6 to about 8. The surface pH can be measured by filtering an aqueous solution which comprises about 50% by weight of a sanding residue powder from the artificial marble after one hour and then measuring the pH of the filtered solution.

In another exemplary embodiment of the present invention, the inorganic artificial marble may be prepared by mixing the inorganic powder and chip component (for forming a pattern) as described herein and adding a colloid solution of the acidic activator having a pH of about 0.1 to about 6 into the mixture to form a slurry. Then, the slurry can be sprayed into a molding cell, and a plate may be prepared on a flat board by vibration compression and vacuum treatment as known in the art, and cured by hardening the slurry at a temperature of about 50 to about 100° C. for about 0.5 to about 10 hours. The surface of resultant inorganic artificial marble may be polished to form a final product.

In another exemplary embodiment of the present invention, the inorganic powder may be used in an amount of about 5 to about 85% by weight and the colloid solution of the acidic activator may be used in an amount of about 15 to about 95% by weight.

The artificial marble slurry may have pH of about 6 to about 8. The artificial marble slurry may be hardened at a temperature of about 20 to about 100° C., for example about 60 to about 90° C. The surface pH of the inorganic artificial marble can be measured by filtering an aqueous solution which comprises about 50% by weight of a sanding residue powder of the artificial marble after one hour and then measuring the pH of the filtered solution. For example, the surface pH may be about 6.5 to about 7.5. Accordingly, the prepared inorganic artificial marble may not suffer surface corrosion after being exposed to acid rain and can have excellent durability without deterioration.

As discussed herein, the inorganic artificial marble can have a pH of about 6 to about 8 because it includes an inorganic mixture, and not a resin or general cement material. Accordingly, the prepared inorganic artificial marble can replace natural stone and be used as an exterior finishing material due to its excellent impact strength, coloring resistance, weather resistance and durability.

The invention may be better understood by reference to the following examples which are intended for the purpose of illustration and are not to be construed as in any way limiting the scope of the present invention, which is defined in the claims appended hereto.

Example 1

An inorganic powder is prepared by baking kaolin and brucite at 350° C. and thereafter pulverizing the baked kaolin and brucite. An inorganic artificial marble slurry is prepared by mixing 90 parts by weight of quartz-silica chip and 10 parts by weight of the inorganic powder and 30 parts by weight of an acidic activator with a pH of 1 is added to the mixture. The acidic activator is prepared by adding hydrochloric acid to an aqueous solution including a solid content of 55% by weight of sodium silicate and potassium silicate to adjust the pH of the aqueous solution to 1.

The artificial marble slurry is sprayed into a molding cell, and a plate is prepared on a flat board by vibration compression and vacuum treatment, and cured by hardening at 70° C. for 3 hours. Then, the final inorganic artificial marble product is prepared by polishing the surface. The surface is represented by FIG. 1.

The surface pH is measured by filtering an aqueous solution which comprises 50% by weight of a sanding residue powder of the artificial marble after one hour, and the surface pH is 7. 3 g of hydrochloric acid is dropped onto the surface of the prepared artificial marble, the surface is wiped, and surface corrosion does not appear.

To test weather resistance, a Q-UV test is conducted and the value of $\Delta E$ is measured using a colorimeter (Minolta Co., Ltd., CM-370) after irradiating the sample with ultraviolet rays for 24 hours using a uvcon device (Atlas Electrical Devices Co.). The value of $\Delta E$ is 0.42, and the coloring resistance and weather resistance are excellent.

Example 2

Figure 2:
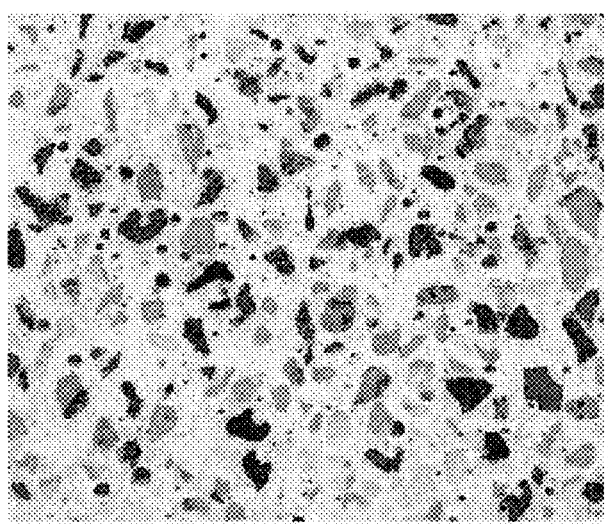
FIG. 2 is a picture representing a product of the inorganic artificial marble prepared according to Example 2 of the present invention.

Example 2 is prepared in the same manner as Example 1 except that quartz-silica chip is replaced with broken stone chip. The surface pH is 7. A picture of the surface of the prepared artificial marble is represented by FIG. 2. 3 g of hydrochloric acid is dropped onto the surface of the prepared artificial marble, the surface is wiped, and surface corrosion does not appear. The value of $\Delta E$ is 0.41, and the coloring resistance and weather resistance are excellent as in Example 1.

Comparative Example 1

Comparative Example 1 is prepared in the same manner as Example 1 except that an activator which does not include hydrochloric acid is used after the aqueous solution which comprises a sodium silicate and potassium silicate solid content of 55% by weight is prepared. The surface pH is 13. 3 g of hydrochloric acid is dropped onto the surface of the prepared artificial marble, the surface is wiped, and surface corrosion appears.

Comparative Example 2

Organic engineered stone (E-stone) (Hanwha L&C Corporation, Khanstone) is prepared by using 10% by weight of silica chip and 90% by weight of unsaturated polyester organic binder. The value of $\Delta E$ of the organic engineered stone is 3.0, and the coloring resistance and weather resistance are relatively poor.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An artificial marble comprising a matrix, wherein said artificial marble has a surface pH of about 6 to about 8, wherein said matrix comprises an inorganic powder and an activator, and wherein the artificial marble further comprises an inorganic polymer comprising poly(sialate), poly(sialate-siloxo), poly(sialate-disiloxo), or a combination thereof.

2. The artificial marble of claim 1, wherein said activator comprises an alkali metal silicate, an alkaline earth metal silicate or a combination thereof.

3. The artificial marble of claim 1, wherein said inorganic powder comprises Al, Si and O.

4. The artificial marble of claim 1, wherein said inorganic powder comprises kaolin, brucite or a combination thereof.

5. The artificial marble of claim 4, wherein said inorganic powder further comprises alkali metal oxide powder, alkaline earth metal powder or a combination thereof.

6. The artificial marble of claim 1, wherein said inorganic powder has a size of about 1 to about 100 μm.

7. The artificial marble of claim 1, wherein an inorganic material in the inorganic matrix comprises about 20 to about 40% by weight of Al and Si and about 60 to about 80% by weight of an alkali metal, alkaline earth metal, or a combination thereof when the inorganic material is analyzed by IPC-OES.

8. The artificial marble of claim 1, wherein said inorganic polymer comprises a structure represented by the following Chemical Formula 1 or Chemical Formula 2 or a combination thereof:

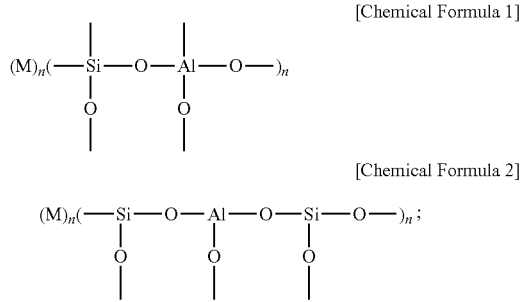

[Chemical Formula 1]

[Chemical Formula 2]

wherein in both of Chemical Formula 1 and Chemical Formula 2, each M comprises a Group I, II, or VII element of the Periodic Table, or a combination thereof and each n represents the number of repeat units.

9. The artificial marble of claim 1, further comprising a chip component.

10. The artificial marble of claim 9, wherein said chip.

11. The artificial marble of claim 9, wherein said chip component comprises organic chips, inorganic chips or a combination thereof.

12. The artificial marble of claim 11, wherein said organic chip comprises unsaturated polyester chip, acrylic chip, halogenated epoxy acrylate chip, halogenated urethane acrylate chip, halogenated ethoxy acrylate diacrylate chip or a combination thereof.

13. The artificial marble of claim 11, wherein said inorganic chip comprises broken stone chip, quartz, quartz-silica chip, silica stone powder, quartz glass, synthetic quartz, silica silicon dioxide, silica glass, mirror or a combination thereof.

14. The artificial marble of claim 9, comprising the matrix in an amount of about 1 to about 50% by weight and the chip component in an amount of about 50 to about 99% by weight.

15. A matrix comprising:
(a) about 5 to about 95% by weight of an inorganic powder including about 1 to about 67.7% by weight of Al, about 3 to about 69.7% by weight of Si and about 20 to about 86.7% by weight of O;
(b) about 5 to about 95% by weight of an activator;
wherein the matrix further comprises (c) a chip component distributed therein, wherein the chip component (c) comprises comprising organic chips, inorganic chips or a combination thereof, wherein said organic chip comprises unsaturated polyester chip, acrylic chip, halogenated epoxy acrylate chip, halogenated urethane acrylate chip, halogenated ethoxy acrylate diacrylate chip or a combination thereof, and wherein said inorganic chip comprises broken stone chip, quartz, quartz-silica chip, silica stone powder, quartz glass, synthetic quartz, silica silicon dioxide, silica glass, mirror or a combination thereof.

16. A composition for an artificial marble comprising:
about 1 to about 50% by weight of a matrix, the matrix comprising (a) about 5 to about 95% by weight of an inorganic powder including about 1 to about 67.7% by weight of Al, about 3 to about 69.7% by weight of Si and about 20 to about 86.7% by weight of O, and (b) about 5 to about 95% by weight of activator, and
about 50 to about 90% by weight of a chip component comprising organic chips, inorganic chips or a combination thereof, wherein said organic chip comprises unsaturated polyester chip, acrylic chip, halogenated epoxy acrylate chip, halogenated urethane acrylate chip, halogenated ethoxy acrylate diacrylate chip or a combination thereof, and wherein said inorganic chip comprises broken stone chip, quartz, quartz-silica chip, silica stone powder, quartz glass, synthetic quartz, silica silicon dioxide, silica glass, mirror or a combination thereof.

17. The composition of claim 16, wherein said activator comprises an alkali metal silicate compound, an alkaline earth metal silicate compound or a combination thereof.

18. The composition of claim 17, wherein said alkali metal silicate compound, alkaline earth metal silicate compound or a combination thereof is in the form of an aqueous solution phase having a solids content of about 1 to about 80% by weight.

19. The composition of claim 16, wherein said activator further comprises an acidic pH control agent and is an acidic activator.

20. The composition of claim 19, wherein the pH of the activator is about 0.1 to about 6.

21. The composition of claim 19, wherein the pH of the activator is about 1 to about 2.

22. The composition of claim 16, further comprising an additive comprising a colorant, coupling agent, ultraviolet absorber, antistatic agent, inorganic filler or a combination thereof.

23. An artificial marble prepared by hardening the composition for artificial marble of claim 16, and having a surface pH of about 6 to about 8 measured by filtering an aqueous solution comprising about 50% by weight of a sanding residue powder of the artificial marble after one hour.

24. The artificial marble of claim 23, wherein said artificial marble comprises a matrix comprising an inorganic material comprising about 20 to about 40% by weight of Al and Si and about 60 to about 80% by weight of alkali metal, alkaline earth metal, or a combination thereof when the inorganic material is analyzed by IPC-OES.

* * * * *

UNITED STATES PATENT AND TRADEMARK OFFICE
CERTIFICATE OF CORRECTION

PATENT NO.        : 8,535,804 B2
APPLICATION NO.   : 12/642148
DATED             : September 17, 2013
INVENTOR(S)       : Park et al.

Page 1 of 1

It is certified that error appears in the above-identified patent and that said Letters Patent is hereby corrected as shown below:

<u>In the Specification</u>

Column 2, Line 50 reads: "antistatic agent, inorganic ~~tiller~~ and the like and combinations"
and should read: "antistatic agent, inorganic <u>filler</u> and the like and combinations"

Column 5, Line 9 reads: "~~tiller~~ and the like and combinations thereof. In an exemplary"
and should read: "<u>filler</u> and the like and combinations thereof. In an exemplary"

<u>In the Claims</u>

Claim 10, Column 7, Line 55 reads: "The artificial marble of claim 9, wherein said chip."
and should read: "The artificial marble of claim 9, wherein said chip <u>component has a size of about 0.5 to about 30 mm</u>."

Claim 15, Column 8, Line 12 reads: "comprises ~~comprising~~ organic chips, inorganic chips or"
and should read: "comprises organic chips, inorganic chips or"

Signed and Sealed this
Eighth Day of April, 2014

Michelle K. Lee
*Deputy Director of the United States Patent and Trademark Office*